United States Patent [19]
Craigie

[11] 3,936,019
[45] Feb. 3, 1976

[54] EJECTOR RELEASE UNIT FOR USE IN AIRCRAFT

[75] Inventor: Samuel W. Craigie, Maidenhead, England

[73] Assignee: M. L. Aviation Company Limited, England

[22] Filed: Feb. 19, 1974

[21] Appl. No.: 443,250

[30] Foreign Application Priority Data
Feb. 19, 1973 United Kingdom............. 8060/73

[52] U.S. Cl............................ 244/137 R; 89/1.5 F
[51] Int. Cl.²......................................... B64D 1/02
[58] Field of Search................. 89/1.5 R, 1.5 F; 244/137 R; 294/83 AE

[56] References Cited
UNITED STATES PATENTS
3,610,094   10/1971   Craigie........................... 244/137 R Primary Examiner—Stephen C. Bentley
Attorney, Agent, or Firm—Brisebois & Kruger

[57] ABSTRACT

This invention is concerned with an ejection release unit for releasing and projecting a store from an aircraft. The unit comprises a releasable latching mechanism for supporting the store, a pair of telescopic ejection guns for projecting the store from the aircraft, a breech for one or more cartridges which, on ignition, produce pressure gas which causes the latching mechanism to release the store and also acts on a piston which indirectly transmits the resultant force to a body of hydraulic fluid, which, in its turn, operates the ejection gun at each side. Preferably, there are two oppositely acting pistons, each of which pistons transmits pressure to a separate body of hydraulic fluid for operating a respective ejection gun. The breeches may be formed in a removable unit which also defines the cylinders within which the pistons work.

6 Claims, 1 Drawing Figure

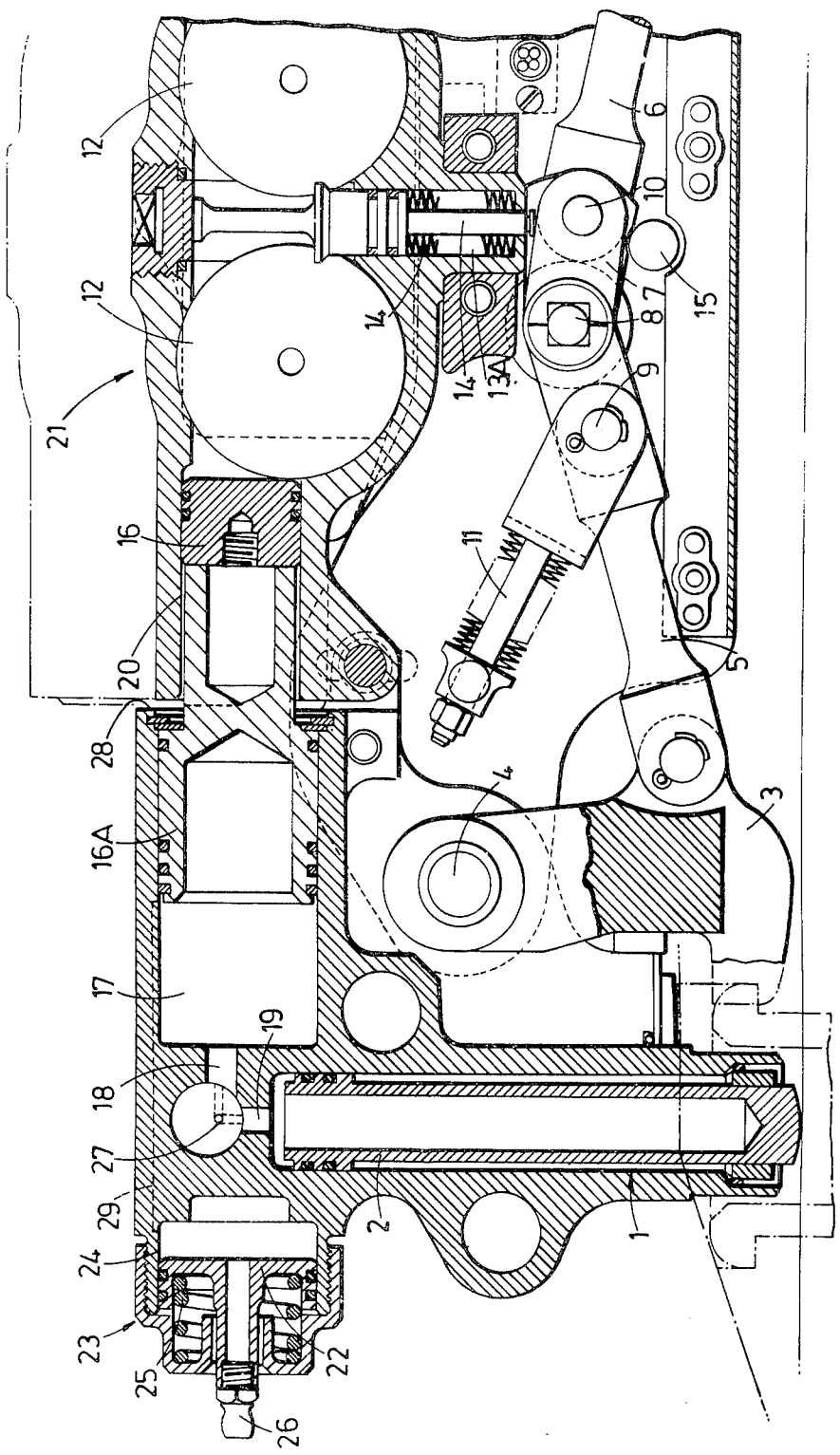

EJECTOR RELEASE UNIT FOR USE IN AIRCRAFT

This invention relates to ejector release units for releasing and projecting stores such as bombs and similar heavy objects from aircraft. Examples of such units are described in our prior British patent specifications Nos. 1,058,997 and 1,248,926 and comprise basically a releasable latching mechanism for holding the store and eventually releasing it and a pair of ejection guns for projecting the store from the aircraft. Both of these mechanisms are operated by high pressure gas from explosive cartridges and, in practice, two such cartridges are always fitted so as to overcome the risk of one cartridge misfiring.

Since one cartridge must be able to operate alone if the other misfires, the cartridges are fitted in breeches arranged side by side and, since the arrangement is a symmetrical one, the breeches are arranged approximately in the middle of the apparatus, that is to say equidistant from the two ejection guns. The connections to the latching mechanism are made mechanically and a piston for operating the mechanical linkage may thus be situated in a cylinder immediately adjacent the two breeches. On the other hand, since the two ejection guns are spaced away from the breeches by half the length of the apparatus as a whole, the gas from the cartridges must travel along a path of this length. Each path normally includes a throttling device as described in the above-mentioned specifications, and in addition the path inevitably includes corners and so forth which tend to collect a deposit of carbon and other small particles as a result of the firing of the cartridges. For example, small particles of explosive from the cartridges tend to be carried along with the gas stream and small particles of the cartridge cases may also be carried along the passage. Although it is possible to design a construction of cartridge holder by means of which the problem of free particles is greatly reduced, but there is still inevitably a deposit from the products of combustion. Consequently, thorough cleaning is necessary after every few operations of the unit.

According to the present invention, the gas pressure from the cartridges acts on a piston which indirectly transmits the resultant force to a body of hydraulic fluid, which, in its turn, operates the ejection gun at each side. As a result of this construction, the gas itself need travel only a very short distance to operate the piston, the necessary pressure for operating each ejection gun being transmitted for the remainder of the distance by the hydraulic fluid. Consequently, any deposit of particles and other dirt is localised in the immediate vicinity of the breech and since the remainder of the circuit is filled with hydraulic fluid, it requires no cleaning at all.

In order to provide a balanced assembly, two oppositely acting pistons may be used, each transmitting pressure to a separate body of hydraulic fluid for operating a respective ejection gun.

Preferably any cleaning which may be required is still further simplified by forming the breeches for the reception of the cartridges in a removable unit which also defines the cylinders within which the pistons work and which receive any deposit there may be from the combustion of the cartridges. When the cartridges are fired, the pistons are forced outwardly by the gas pressure and the resultant pressure transmitted through the hydraulic fluid then extends the ejection guns as previously described. After firing, the ejection guns remain in their extended position and the pistons also remain in their outermost position to which they have been moved by the gas pressure. The removable unit referred to above is preferably arranged to terminate at each side along a line defined by the end face of each piston. Consequently, when each piston is in its outermost position, the unit may be removed without difficulty. If the apparatus as a whole requires to be re-used at short notice, the complete removable unit may be replaced by a fresh, clean unit. Once the original removable unit has been cleaned and replaced or, alternatively, a new unit has been fitted in its place, the ejection guns can be restored to their normal retracted positions. The movement of the guns is transmitted through the hydraulic fluid to the two pistons which are thereby moved inwardly to their starting positions.

In the earlier constructions described in the above-mentioned specifications, throttle members are fitted in order to regulate the pressure of the gas for operating the ejection guns. In a construction in accordance with the present invention, similar throttles may be fitted so as to have a similar controlling effect on the hydraulic fluid rather than on the gas.

The present invention will now be described more fully, by way of example only, with reference to the accompanying drawing, which is a sectional view of one side of an ejection release unit, the other side being of similar construction.

The unit includes a pair of ejection guns 1, each of which has a piston indicated generally at 2 which acts against the upper surface of a store carried by the unit. The store is held in position by a pair of latch members 3 which are pivoted about horizontal axes, the latch member shown in the accompanying drawing being pivoted about horizontal axis 4. In operation the guns 1 are fired simultaneously and the latch members 3 are moved towards one another simultaneously so as to release the store which is then ejected downwardly by the combined downward thrust of the guns 1.

The latch members 3 are controlled by a toggle linkage to which they are connected by rods 5 and 6. The toggle linkage consists of a lever 7 pivoted at 8 about a horizontal axis and pivotally connected to the two rods 5 and 6 at 9 and 10 respectively. A compression spring 11 acts between the point 9 and the framework of the unit and retains the linkage in the position shown. The unit includes two breeches 12 for identical electrically ignited cartridges. When these cartridges are ignited, the resulting gas pressure acts against a piston 13 located in a cylinder 13A and forces the piston 13 downwardly against the bias of a compression spring 14. The piston 13 contacts the point 10 of the toggle linkage and if a safety pin 15 has been withdrawn, it pushes the linkage over centre. Once this has occurred, the downward force of the store carried by the unit turns the latch members 3 about their respective horizontal axes 4, and the rods 5 and 6 towards one another thus releasing itself. As this occurs, the point 9 moves overcentre whereupon the compression spring 11 retains the linkage in the new position.

At the same time, the pressure gas passes from the cartridges to act against the pistons 16, only one of which is shown, as the other one is the same. The piston 16 transmits thrust to an auxiliary piston 16A and thus indirectly to a body of hydraulic fluid in chamber 17 which is thus forced through passages 18 and 19 to operate ejection gun 1. A throttling device 27 is located between passages 18 and 19, by means of which the pressure of the hydraulic fluid can be regulated as desired. After firing, the ejection guns remain in their extended position and the pistons 16, and 16A also remain in their outermost position to which they have been moved by the gas pressure. The section of the ejection release unit containing the breeches, the cylinder 13A, the pistons 16 and the cylinders 20, each of which contains the rear end of the auxiliary pistons 16A before the cartridges are fired, comprises a removable unit. In the drawing, the piston 16A is shown with its rear end located in cylinder 20. However, when the piston is in its outermost position the removable unit indicated generally at 21 may be removed without difficulty, as the outer face of piston 16A is then flush with the intersection 28. As mentioned previously, any deposit from the cartridges is extremely localised and by the use of the removable unit 21 the parts of the apparatus carrying the deposit can be completely removed from the apparatus and either cleaned quite quickly or completely replaced. As the cylinder 13A is formed within the removable unit 21, the deposit within this cylinder can be removed at the same time as that within the cylinders 20 or, if a fresh unit is fitted, this will include a fresh piston and cylinder for operating the mechanical toggle linkage.

Over long periods there may be a small degree of leakage of hydraulic fluid and to counteract this a spring loaded piston 22 is fitted to each side so as to keep each volume of fluid under pressure at all times and also to allow for any changes of volume with temperature. This piston 22 is located in a short extension 23 of the horizontal path of fluid. The extension 23 defines a cylinder 24 within which the piston 22 slides and a compression spring 25 is mounted between the rear of the piston 22 and a valve 26 is fitted to the end of the extension 23. The spring 25 forces the piston 22 inwardly to compensate for any small leakage of hydraulic fluid and can yield in the event of expansion due to rise of temperature. The fluid in the extension 23 is not in direct communication with the main body of fluid in chamber 17, but a narrow passage 29 (shown in dotted line) runs along the thickness of the wall to connect the extension 23 with a point just beyond the free end of the piston 16A. Prior to firing hydraulic fluid can flow freely along this passage in either direction, but immediately after firing movement of the piston 16A closes the end of the passage 29 so that the fluid in the extension 23 is automatically shut off from the sudden rise in pressure in the fluid, which is thus all available for operation of the ejection gun 1. The system may be periodically topped up with hydraulic fluid through the valve 26.

I claim:

1. In an ejector release unit for releasing and projecting a store from an aircraft,
   a latching mechanism for projecting and releasing said store;
   a pair of ejection guns for projecting said store from said aircraft;
   a breech and firing contact for at least one cartridge, ignition of said at least one cartridge producing pressure gas;
   the improvement comprising a cylinder and a piston mounted for reciprocatory movement within said cylinder, said cylinder being connected to said breech; and a chamber having fluid connections to each said ejection gun, a body of hydraulic fluid being contained within said chamber; and means capable of operation by said piston when said gas acts thereon to transmit the resultant force to said body of fluid whereby said fluid is caused to flow through said connections to operate said ejection guns.

2. An ejection release unit according to claim 1, in which there are two oppositely acting pistons, each of which pistons transmits pressure to a separate body of hydraulic fluid for operating a respective ejection gun.

3. An ejection release unit according to claim 2, in which the breeches are formed in a removable unit which also defines the cylinders within which the pistons work.

4. An ejection release unit according to claim 3, in which the removable unit is arranged to terminate at each side along a line defined by the end face of each piston.

5. An ejection release unit according to claim 1, in which throttling devices are fitted in order to regulate the pressure of the hydraulic fluid for operating the ejection guns.

6. An ejection release unit according to claim 1, in which a spring loaded piston is fitted, the piston being located in a short extension of the unit, the extension defining a cylinder within which the piston slides and a compression spring being mounted between the rear of the piston and the end of the extension to force the piston inwardly to compensate for any small leakage of hydraulic fluid and to yield in the event of expansion due to rise of temperature, there being a small passage extending from the extension to a point just beyond the free end of the piston so that prior to firing, hydraulic fluid can flow freely along this passage in either direction, but immediately after firing movement of the piston closes the end of the passage so that fluid in the extension is automatically shut off from the sudden rise in pressure in the fluid.

* * * * *